(12) United States Patent
Li et al.

(10) Patent No.: US 12,474,291 B2
(45) Date of Patent: Nov. 18, 2025

(54) MULTI-DIMENSIONAL MULTI-PARAMETER GAS SENSOR AND MANUFACTURING METHOD THEREFOR, AND GAS DETECTION METHOD

(71) Applicants: CHINA PETROLEUM & CHEMICAL CORPORATION, Beijing (CN); SINOPEC RESEARCH INSTITUTE OF SAFETY ENGINEERING CO., LTD., Shandong (CN)

(72) Inventors: Na Li, Shandong (CN); Fei An, Shandong (CN); Bing Sun, Shandong (CN); Zhe Yang, Shandong (CN); Shanjun Mu, Shandong (CN); Wei Xu, Shandong (CN); Jie Jiang, Shandong (CN); Haozhi Wang, Shandong (CN); Shiqiang Wang, Shandong (CN)

(73) Assignees: CHINA PETROLEUM & CHEMICAL CORPORATION, Beijing (CN); SINOPEC RESEARCH INSTITUTE OF SAFETY ENGINEERING CO., LTD., Shandong (CN)

( * ) Notice: Subject to any disclaimer, the term of this patent is extended or adjusted under 35 U.S.C. 154(b) by 470 days.

(21) Appl. No.: 17/904,626

(22) PCT Filed: Jan. 26, 2021

(86) PCT No.: PCT/CN2021/073721
§ 371 (c)(1),
(2) Date: Aug. 19, 2022

(87) PCT Pub. No.: WO2021/203803
PCT Pub. Date: Oct. 14, 2021

(65) Prior Publication Data
US 2023/0115363 A1     Apr. 13, 2023

(30) Foreign Application Priority Data

Apr. 10, 2020   (CN) ......................... 202010280996.1

(51) Int. Cl.
*G01N 27/407* (2006.01)
*B82Y 15/00* (2011.01)
(Continued)

(52) U.S. Cl.
CPC ............ *G01N 27/407* (2013.01); *B82Y 15/00* (2013.01); *G01N 27/14* (2013.01);
(Continued)

(58) Field of Classification Search
None
See application file for complete search history.

(56) References Cited

U.S. PATENT DOCUMENTS

| 5,019,885 A | 5/1991 | Yagawara et al. |
| 8,410,560 B2 * | 4/2013 | Ali .......................... G01N 27/18 438/468 |

(Continued)

FOREIGN PATENT DOCUMENTS

| CN | 201993124 U | 9/2011 |
| CN | 103969297 A | 8/2014 |

(Continued)

*Primary Examiner* — Peter J Macchiarolo
*Assistant Examiner* — Jermaine L Jenkins
(74) *Attorney, Agent, or Firm* — NKL Law; Allen Xue (57) ABSTRACT

A gas sensor has a sensing structure that is used for generating, for a variety of gases, multiple corresponding electric signals. It has a plurality of measuring electrodes and a gas-sensitive film coating the measuring electrodes; and a micro-heating structure that is used for providing different heating temperatures for the sensing structure, and a silicon-based substrate and a heating layer disposed on the silicon-based substrate. The heating layer integrates heating electrodes of different sizes or different layouts to form a
(Continued)

plurality of heating regions of different temperatures, and the plurality of measuring electrodes are respectively disposed in the corresponding heating regions. By integrating heating electrodes of different sizes or different layouts on a single micro-heating structure to form heating regions of different temperatures, a complex atmosphere detection function of a variety of sensing materials at different temperatures is achieved.

17 Claims, 9 Drawing Sheets

(51) Int. Cl.
    *G01N 27/14*     (2006.01)
    *G01N 27/22*     (2006.01)
    *G01N 27/414*     (2006.01)
    *G01N 33/00*     (2006.01)

(52) U.S. Cl.
    CPC ... G01N 33/0036 (2013.01); *G01N 2027/222* (2013.01); *G01N 27/4146* (2013.01)

(56) References Cited

U.S. PATENT DOCUMENTS

| | | | |
|---|---|---|---|
| 10,488,358 B2 | 11/2019 | Udrea et al. | |
| 11,041,838 B2* | 6/2021 | Rogers | G01N 27/125 |
| 11,187,655 B2* | 11/2021 | Ryu | G01N 21/3504 |
| 2006/0154401 A1 | 7/2006 | Gardner et al. | |
| 2007/0212263 A1* | 9/2007 | Shin | G01N 27/16 422/95 |
| 2011/0174799 A1 | 7/2011 | Ali et al. | |
| 2018/0017516 A1 | 1/2018 | Dobrokhotov et al. | |
| 2019/0004020 A1 | 1/2019 | Dobrokhotov et al. | |
| 2019/0293590 A1 | 9/2019 | Merz et al. | |

FOREIGN PATENT DOCUMENTS

| | | | | |
|---|---|---|---|---|
| CN | 110161084 A | | 8/2019 | |
| CN | 210745113 U | | 6/2020 | |
| CN | 211877913 U | | 11/2020 | |
| CN | 109298028 B | * | 6/2021 | ............. G01N 27/12 |
| EP | 2778667 A1 | | 9/2014 | |
| GB | 2422017 A | | 7/2006 | |
| IN | 106469501 A | | 3/2017 | |
| JP | 2006194853 A | | 7/2006 | |
| JP | 2014153135 A | | 8/2014 | |
| KR | 20060100874 A | * | 3/2005 | ......... G01N 33/0036 |
| KR | 100609768 B1 | | 8/2006 | |
| KR | 20170089446 A | | 8/2017 | |
| KR | 20200120009 A | * | 4/2019 | ............. G01N 27/40 |
| WO | 2014012948 A1 | | 1/2014 | |

\* cited by examiner

MULTI-DIMENSIONAL MULTI-PARAMETER GAS SENSOR AND MANUFACTURING METHOD THEREFOR, AND GAS DETECTION METHOD

FIELD OF THE INVENTION

The present invention relates to the technical field of gas sensors, and particularly relates to a gas sensor and a manufacturing method therefor, and a gas detection method.

BACKGROUND OF THE INVENTION

There are various means for gas detection. Among them, a gas sensor based on the metal-oxide-semiconductor sensing principle can be used for not only detecting toxic gases down to the ppb level and also detecting flammable and explosive gases in percentage concentrations, thereby being widely used. The principle of the gas sensor is as follows: parameters such as the composition and concentration of gas are converted into a resistance variation quantity, and then the resistance variation quantity is converted into current and voltage output signals to achieve a detection function. Specifically, a metal-oxide-semiconductor (MOS), which is a gas-sensitive resistance material, is prepared by an impurity defect with a deviation from a stoichiometric ratio. In synthesis of the gas-sensitive material, certain precious metals are doped or loaded for the purpose of improving the selectivity or sensitivity of a material to certain gas components. MOS materials are divided into P-type semiconductors and N-type semiconductors, for example, P-type semiconductors such as NiO and PbO, and N-type semiconductors such as $SnO_2$, $WO_3$, $Fe_2O_3$ and $In_2O_3$. Metal oxides are insulators at room temperature, but can show the gas-sensitive property when processed into the metal oxide semiconductor (MOS). When a MOS material is exposed to a gas to be measured, the resistivity of the MOS material changes obviously due to adsorption of the gas on the surface of the MOS material, and the resistivity returns to an initial state after desorption. The adsorption of the gas by the MOS material may include physical adsorption and chemical adsorption, wherein the physical adsorption is mainly present at room temperature, which means molecular adsorption between the gas and the surface of the MOS material with no presence of electron exchange and no chemical bond formed therebetween. Chemical adsorption means that ionic adsorption is established between the gas and the surface of the MOS material, and electron exchange and chemical bond are present. If the MOS material is heated to increase its temperature, the chemical adsorption strengthens and reaches a maximum at a certain temperature. When the temperature of the MOS material exceeds a certain value, a desorption state appears, and both the physical adsorption and chemical adsorption weaken. For example, the most common MOS material, tin oxide ($SnO_2$), adsorbs a gas at room temperature with little change in resistivity, which indicates the physical adsorption at the moment; and if the MOS material is heated while the gas concentration is kept constant, the conductivity of the MOS material increases significantly with the increase of temperature, and has a significant change especially in a temperature range of 100-500° C. Therefore, the temperature required for operation of a gas-sensitive element prepared by the MOS material is much higher than room temperature, and varied temperatures are required for different MOS materials to detect different gas components and concentrations.

There may be more than a dozen types of gases in a gas mixture in a complex atmosphere environment, and to achieve complex atmosphere detection, a sensor device capable of detecting various gases simultaneously is required. At present, a sensor device for complex atmosphere detection achieves a complex atmosphere detection function by usually using multiple identical micro-heating chip units arranged independently to form a sensor array, and heating corresponding gas-sensitive sensing materials respectively by the multiple micro-heating chip units. As the respective micro-heating chips of the sensor array need to be heated separately, the multiple micro-heating chips need multiple heating structures, and thus the device has low overall integration, a large volume and high power consumption, which cannot achieve the advantages of a small size and the low energy consumption of a semiconductor gas sensor device. Moreover, the micro-heating chips of the above-mentioned gas sensor device have a single heating temperature, and one micro-heating chip correspondingly heats one gas-sensitive sensing material, which cannot achieve complex atmosphere detection by a single chip in combination with multiple MOS sensing materials at different temperatures.

SUMMARY OF THE INVENTION

An objective of the present invention is to provide a multi-dimensional multi-parameter gas sensor and a manufacturing method therefor, which improves the integration of a gas sensor to achieve complex atmosphere detection by a single gas sensor in combination with multiple gas-sensitive sensing materials.

To achieve the above objective, in a first aspect, the present invention provides a gas sensor for detecting a variety of gases, including: a sensing structure that is used for generating, for a variety of gases, multiple corresponding electric signals, and includes a plurality of measuring electrodes and a gas-sensitive film coating the measuring electrodes; and a micro-heating structure that is used for providing different heating temperatures for the sensing structure, and includes a silicon-based substrate and a heating layer disposed on the silicon-based substrate. The heating layer integrates heating electrodes of different sizes or different layouts to form a plurality of heating regions of different temperatures, and the plurality of measuring electrodes are respectively integrated in corresponding heating regions.

Further, a plurality of heating electrodes are present, at least one of the plurality of heating electrodes has a different cross-sectional area or length from other heating electrodes, and the plurality of heating electrodes form different heating regions.

Further, the heating electrode is a heating resistance wire, and the heating resistance wire has a cross-sectional thickness of 300 nm-500 nm, a cross-sectional width of 10 µm-100 µm and a length of 1.5 mm-20 mm.

Further, a plurality of heating resistance wires are arranged to be spaced apart; and a spacing between two adjacent heating resistance wires is 2-5 times the cross-sectional width of the heating resistance wires.

Further, each of the heating resistance wires is connected end to end to form a circular ring shape, and the plurality of heating resistance wires are in gradient distribution on the silicon-based substrate.

Further, the heating electrode includes a first heating resistance wire, a second heating resistance wire, and a third heating resistance wire, wherein the first heating resistance wire has a cross-sectional thickness of 300 nm and a cross-sectional width of 20 μm, and is connected end to end to form a circular ring with an inner ring diameter of 5 μm; the second heating resistance wire has a cross-sectional thickness of 300 nm and a cross-sectional width of 15 μm, and is connected end to end to form a circular ring with an inner ring diameter of 30 μm; and the third heating resistance wire has a cross-sectional thickness of 300 nm and a cross-sectional width of 10 μm, and is connected end to end to form a circular ring with an inner ring diameter of 65 μm.

Further, the first heating resistance wire forms a first heating region, which provides a heating temperature of 570-630° C.; the second heating resistance wire forms a second heating region, which provides a heating temperature of 370-430° C.; and the third heating resistance wire forms a third heating region, which provides a heating temperature of 220-280° C.

Further, the heating electrode is a heating resistance wire with different segments, each segment of the heating resistance wire has a different cross-sectional area, and each segment corresponds to a heating region, respectively.

Further, each segment of the heating resistance wire is arranged to be bent in a serpentine curve, and the measuring electrode is distributed in bent arc regions of the heating resistance wire in each segment.

Further, the heating resistance wire includes a first-segment resistance wire, a second-segment resistance wire, and a third-segment resistance wire, wherein the first-segment resistance wire has a cross-sectional thickness of 100 nm-300 nm and a cross-sectional width of 10 μm, and the first-segment resistance wire is arranged to be bent in a serpentine curve with spacing of 20 μm; the second-segment resistance wire has a cross-sectional thickness of 100 nm-300 nm and a cross-sectional width of 15 μm, and the second-segment resistance wire is arranged to be bent in a serpentine curve with spacing of 10 μm; and the third-segment resistance wire has a cross-sectional thickness of 100 nm-300 nm and a cross-sectional width of 5 μm, and the third-segment resistance wire is arranged to be bent in a serpentine curve with spacing of 30 μm.

Further, the first-segment resistance wire forms a first heating region, which provides a heating temperature of 360-440° C.; the second-segment resistance wire forms a second heating region, which provides a heating temperature of 580-600° C.; and the third-segment resistance wire forms a third heating region, which provides a heating temperature of 300-360° C.

Further, the heating electrode is distributed in a central region of the heating layer, and the plurality of measuring electrodes are distributed around the heating electrode and are located in the same plane as the heating electrode.

Further, a geometry length of the heating layer is 1-6 times a geometry length of the region where the heating electrode is distributed, and the geometry length of the heating layer is between 500 μm and 3000 μm.

Further, the heating electrode is formed by winding a heating resistance wire; and the heating resistance wire has a cross-sectional thickness of 300 nm-500 nm, a cross-sectional width of 10 μm-100 μm and a cross-sectional length of 1.5 mm-13 mm.

In a second aspect, the present invention provides a manufacturing method for a gas sensor, the method including the following steps: preparing, on a silicon-based substrate, a heating layer with a plurality of heating regions of different temperatures to form a micro-heating structure; preparing corresponding measuring electrodes in the plurality of heating regions, respectively, and coating a surface of each measuring electrode with a corresponding gas-sensitive film to form a sensing structure, wherein the gas-sensitive film is made of a metal oxide nano-gas-sensitive material, which is any one or more of $SnO_2$, $WO_3$, $In_2O_3$, NiO, $MoO_2$, $Co_3O_4$, ZnO, and MoS; and packaging the micro-heating structure and the sensing structure as a micro-sensing chip.

Further, the preparing, on a silicon-based substrate, a heating layer with a plurality of heating regions of different temperatures includes: preparing, on the silicon-based substrate, a plurality of heating resistance wires with different cross-sectional areas or a heating resistance wire having the plurality of segments with different cross-sectional areas to form the plurality of heating regions of different temperatures.

Further, the coating a surface of each measuring electrode with a corresponding gas-sensitive film includes: coating the surface of each measuring electrode with a gas-sensitive film matched with the heating temperature of the heating region where the measuring electrode is located.

In a third aspect, the present invention provides a gas detection method, the method includes detecting a gas by using the above-mentioned gas sensor.

Further, the gas detection method includes detecting a gas mixture composed of two or more gases.

According to the gas sensor provided in the present invention, by integrating heating electrodes of different sizes or different layouts on a single micro-heating structure to form heating regions of different temperatures to provide corresponding heating temperatures for different sensing materials, a complex atmosphere detection function of a variety of sensing materials at different temperatures is achieved; and meanwhile, the volume of the whole device is decreased, the power consumption is reduced, and the integration level of the gas sensor is improved. Furthermore, based on the three dimensions of selectivity, broad-spectrum response and temperature characteristics of the gas-sensitive materials, the gas sensor of the present invention can achieve a multi-parameter (different sensing materials and different temperatures) gas detection function, thereby achieving complex atmosphere detection by a single gas sensor in combination with multiple sensing materials at different temperatures.

Other features and advantages of implementations of the present invention will be described in detail in the subsequent section of detailed description of the embodiments.

BRIEF DESCRIPTION OF DRAWINGS

The accompanying drawings are intended to provide further understanding of the implementations of the present invention and form part of the specification, and are used, together with the following detailed description of the embodiments, for explaining the implementations of the present invention, but do not limit the implementations of the present invention. In the drawings.

DESCRIPTION OF REFERENCE NUMERALS

10—silicon-based substrate, 20—heating layer, 21—heating electrode, 22—measuring electrode, 23—heating electrode pad, 24—measuring electrode pad, 25—heating electrode lead, 30—sensing structure, 201—first heating region, 202—second heating region, 203—third heating region, 211—first heating resistance wire, 212—second heating resistance wire, 213—third heating resistance wire, 21a—first-segment resistance wire, 21b—second-segment resistance wire, 21c—third-segment resistance wire.

DETAILED DESCRIPTION OF THE EMBODIMENTS

The specific implementations of the present invention will be described in detail below in combination with the accompanying drawings. It should be understood that the specific implementations described here are only used for illustrating and explaining the present invention, instead of limiting the present invention.

An implementation of the present invention provides a multi-dimensional multi-parameter gas sensor for detecting a variety of gases, including a sensing structure, a micro-heating structure, and a signal detection system. The sensing structure is used for generating, for a variety of gases, multiple corresponding electric signals; the micro-heating structure is used for providing different heating temperatures for the sensing structure; and the signal detection system is used for acquiring the multiple electric signals generated by the sensing structure, and determining the type and concentration of gases corresponding to the electric signals according to changes in the electric signals.

Figure 1:
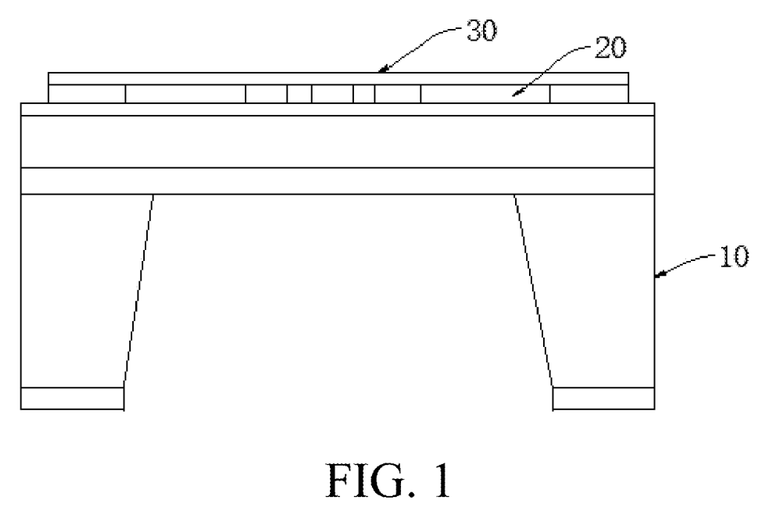
FIG. 1 is a structural diagram of a gas sensor provided in an implementation of the present invention.

FIG. 1 is a structural diagram of a gas sensor provided in an implementation of the present invention. As shown in FIG. 1, the micro-heating structure includes a silicon-based substrate 10 and a heating layer 20 disposed on the silicon-based substrate 10. The heating layer 20 integrates heating electrodes of different sizes or different layouts to form a plurality of heating regions of different temperatures. The sensing structure 30 includes a plurality of measuring electrodes and a gas-sensitive film coating the measuring electrodes. The plurality of measuring electrodes are integrated in the corresponding heating regions, and a response temperature of the gas-sensitive film coating a surface of each measuring electrode is matched with the heating temperature of the heating region where the measuring electrode is located.

The gas-sensitive film is made from a metal oxide nano-gas-sensitive material. The metal oxide nano-gas-sensitive material is, for example, $SnO_2$, $WO_3$, $In_2O_3$, NiO, $MoO_2$, $Co_3O_4$, ZnO, or MoS. Selectivity is a key index of broad-spectrum gas-sensitive materials. By using a method of quantifying the selectivity of gas-sensitive metal oxide sensing materials for a variety of gases, materials with different response characteristics are preferentially selected, and specificity and broad-spectrum categorization are performed so that the sensor can selectively distinguish a target gas from a complex gas mixture to achieve multi-parameter quantitative identification.

The selectivity of a gas-sensitive material for a single gas and its selective adsorption, surface chemical reaction and oxide energy band structure are closely related to a reaction temperature. Suitable sensing materials are preferentially selected based on the selectivity of gas-sensitive materials, and differences in the sensitivity of the gas-sensitive materials for different gases are characterized according to the selectivity to determine a function relationship between the selectivity and the sensitivity. For example, $S_x$ represents the sensitivity of a gas-sensitive material for a gas x in a concentration, and $\Sigma S_x$ represents the sum of the sensitivity of all reference gases in the same concentration, and the selectivity of the sensor for the gas x is defined as $SL_x=(S_x/\Sigma S_x)*100\%$. If the selectivity of a gas-sensitive material is $SL_x \geq 60\%$, it means that the gas-sensitive material has a specificity response property for the gas x and is suitable for acquiring a characteristic value in the sensor; if the selectivity is $20\% \leq SL_x < 60\%$, it means that the gas-sensitive material has a broad-spectrum property and is sensitive to a variety of gases; and if the selectivity is $SL_x < 20\%$, it means that the gas-sensitive material has almost no response to the gas x.

The selectivity of different gas-sensitive materials may be measured by experiments. For example, changes in resistance of a $WO_3$ nanowire are measured to obtain the sensitivity of the $WO_3$ nanowire, thereby obtaining the selectivity of the gas-sensitive material for different gases.

Experimental results of the selectivity of $WO_3$ for various hazardous gases are as follows.

|  | $H_2S$ | EtOH | $NH_3$ | $CH_4$ | CO | $H_2$ | Butane |
|---|---|---|---|---|---|---|---|
| Sensitivity S | 62 | 20 | 1.6 | 0.8 | 1.2 | 13 | 1.4 |
| Selectivity SL | 62.00% | 20.00% | 1.60% | 0.80% | 1.20% | 13.00% | 1.40% |

From the above experimental results, it can be determined that the WO$_3$ nanowire in the gas mixture has a specificity response to H$_2$S, a broad-spectrum response to EtOH, and almost no response to other gases.

As the response sensitivity and selectivity of the gas-sensitive material for different gases vary, to accurately detect the concentration of the target gas, multiple gas-sensitive materials with significantly different selectivity need to be selected to implement multi-parameter detection. Nanomaterials such as SnO2, WO3, In$_2$O$_3$ and NiO are preferentially selected as gas detection parameters by comparative experiments.

The heating regions of the micro-heating structure provide heating temperatures, for different gas-sensitive materials, that are matched with their response temperatures. When the gas-sensitive film on the surface of each measuring electrodes comes into contact with a gas, the resistivity changes obviously at a particular temperature, and the type and concentration of the gas are determined according to the resistivity changes of the measuring electrodes in the different heating regions. As different sensing materials have different response temperatures, the micro-heating structure provides the heating regions of different temperatures for heating different sensing materials to implement cross detection on a single microchip in combination with multiple sensing materials at different temperatures, thereby achieving a complex atmosphere detection function.

Relevant parameters of the micro-heating structure may be determined by thermal process analysis of the heating electrodes. A transient heat transfer process influences a thermal equilibrium rate and dynamic thermal stability of the gas sensor. A characteristic is a relationship between power consumption P and changes in specific heat capacity C, temperature T, thermal resistance R and time t.

$$P = \frac{T(t) - T_{amb}}{R} + C \cdot \frac{dT(t)}{dt}$$

For a material with a density p and a volume V, its specific heat capacity is C=C$_V$ρV. When a time constant is $$\tau = RC, \Delta T = T(t) - T_{amb} = P \cdot R \cdot \left(1 - e^{-\frac{1}{\tau}}\right).$$

Thus, a change in real-time temperature is $$T(t) = T_m - (T_m - T_{amb})e^{-\frac{1}{\tau}},$$

where $T_m$ is a steady state temperature when the heat for heating and the dissipated heat are at the same level, $T_m = T_{amb} + P \cdot R$.

When the heating electrodes reach a preset temperature and start steady-state heat transfer, each part of the micro-heating structure undergoes heat transfer with the external environment, mainly including heat radiation, heat conduction from its central region to the surrounding region, heat conduction in contact with the gas and the gas-sensitive materials, and ambient heat convection, expressed by the following formula:

$$Q_{total} = G_m \cdot \lambda_m (T_{MHP} - T_{amb}) + G_{air}(h_f + \lambda_{air}) \cdot (T_{MHP} - T_{amb}) + G_{rad} \cdot \varepsilon \cdot \sigma(T_{MHP}^4 - T_{amb}^4)$$

where $G_m \cdot \lambda_m (T_{MHP} - T_{amb})$ represents heat transfer from the center to a cantilever, $G_{air}(h_f + \lambda_{air}) \cdot (T_{MHP} - T_{amb})$ represents heat transfer between heterogeneous materials, and $G_{rad} \cdot \varepsilon \cdot \sigma(T_{MHP}^4 - T_{amb}^4)$ represents heat convection;

where $\lambda_m$ represents a heat conduction coefficient of a micro-hot plate, $\lambda_{air}$ represents a heat conduction coefficient of the air, $h_f$ represents an air convection coefficient, ε represents black-body radiation emissivity, σ represents a Boltzmann constant, heat conduction in the direction of a suspension beam can be regarded as one-dimensional heat transfer, a cross-sectional area of the suspension beam is denoted as Abeam, and a length of the suspension beam is I. In addition to the heat loss of heat conduction, the larger the surface area of the heating layer is, the more heat loss in contact with the external environment is, and the greater the generated temperature gradient is. A resistance value of the heating electrodes is expressed as $$R = \frac{1}{\lambda_m \cdot A_{beam}},$$

and thus it can be concluded that in the case of a determined material, the thermal resistance is directly proportional to a conduction path length I, inversely proportional to the cross-sectional area that is passed through, and inversely proportional to the heat conduction coefficient.

The above thermal analysis shows that the steady-state temperature of the micro-heating structure can be changed in three ways: firstly, by changing the thermal resistance of the heating electrodes; secondly, by adjusting a thermal power, i.e., the magnitude of a voltage applied at two ends of the heating electrodes; thirdly, by adjusting the spacing between the heating electrodes, wherein the smaller the spacing is, the higher the heating temperature is. To improve the thermal uniformity, the thermal resistance value needs to be reduced, which can be achieved by selecting materials with high thermal conductivity coefficients on the one hand, and by optimizing a geometrical factor of the heating electrodes on the other hand. Specifically, the thermal uniformity is improved by reducing the effective length I of the heating regions or increasing the cross-sectional area, and meanwhile, increasing the cross-sectional area can also lead to an increase in heat transfer in a steady-state thermal process. In addition, as the thermal resistance decreases, it facilitates an increase in the heat transfer response rate, resulting in a shorter time for the sensing structure to quickly reach thermal equilibrium.

Based on the above analysis, the complex atmosphere detection function of the sensor can be achieved by designing the heating layer with different temperature regions and heating different regions of the sensing structure by the same micro-heating structure.

Embodiment 1

Figure 2:
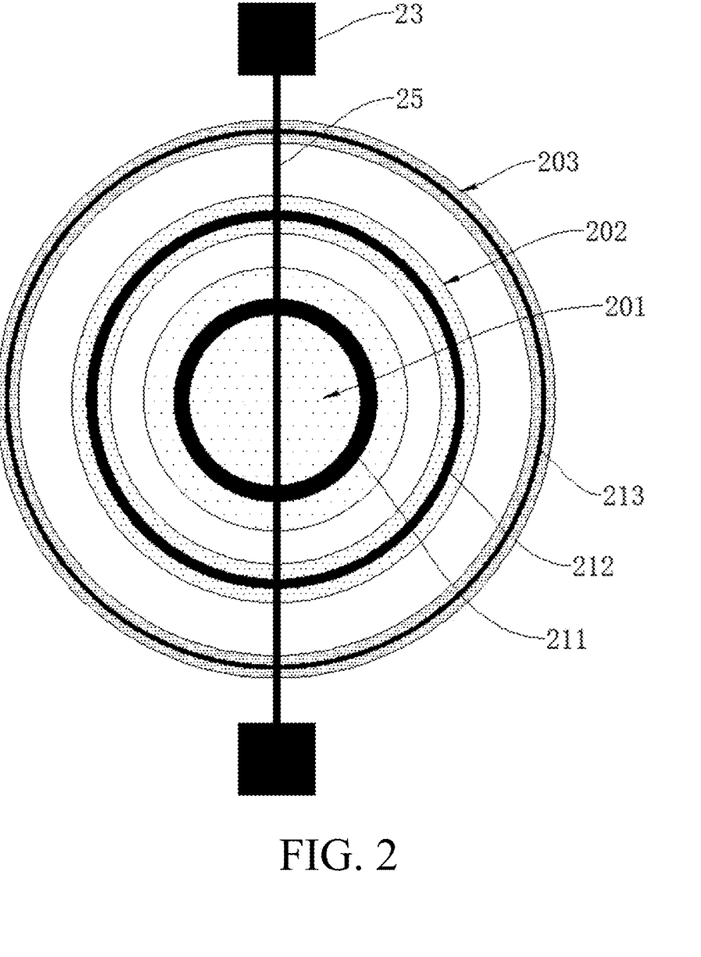
FIG. 2 is a schematic diagram of a heating layer of a gas sensor provided in Embodiment 1 of the present invention.

FIG. 2 is a schematic diagram of a heating layer of a gas sensor provided in Embodiment 1 of the present invention. A plurality of heating electrodes are present on the heating layer, at least one of the plurality of heating electrodes has a different cross-sectional area or length from the other heating electrodes, and the different heating electrodes form different heating regions. The heating electrodes are heating resistance wires, and a plurality of heating resistance wires form a plurality of heating regions.

According to Joule's law, heat produced by an electric current flowing through a conductor is directly proportional to the quadratic of the current, directly proportional to the resistance of the conductor, and directly proportional to power-on time. In other words, when a certain voltage is applied to two ends of a heating resistance wire, the heat generated by a circuit is embodied in the form of temperature on the heating resistance wire. In the same circuit, with a constant density of the flowing current and constant power-on time, changing the resistance of the heating resistance wire can result in different temperatures. The resistance calculation formula is $R=\rho \cdot L/S=\rho \cdot L/(w \cdot t)$, where $\rho$ represents the resistivity of the heating resistance wire (related to the gas-sensitive sensing material), L represents the length of the heating resistance wire, S represents the cross-sectional area of the heating resistance wire ($S=w \cdot t$), w represents the cross-sectional width of the heating resistance wire, and t represents the cross-sectional thickness of the heating resistance wire. According to the resistance calculation formula, increasing the length or reducing the cross section of the heating resistance wire can increase the resistance of the heating resistance wire such that a higher temperature is present, and vice versa. Therefore, the length and cross-sectional area of the heating resistance wire can effectively influence temperature distribution. Generally, the heating temperature required for the gas-sensitive sensing material is 100-700° C., the resistance R of the heating electrodes is 70Ω-250Ω, and the deposited thickness of the heating resistance wire (i.e., cross-sectional thickness t) is 300 nm-500 nm. The cross-sectional width w of the heating resistance wire is 10 µm-100 µm, and its length L is 1.5 mm-20 mm, as calculated according to the above resistance calculation formula. In a preferred implementation, the heating resistance wire has a cross-sectional thickness of 300 nm-500 nm, a cross-sectional width of 10 µm-100 µm and a length of 1.5 mm-20 mm.

Figure 3:
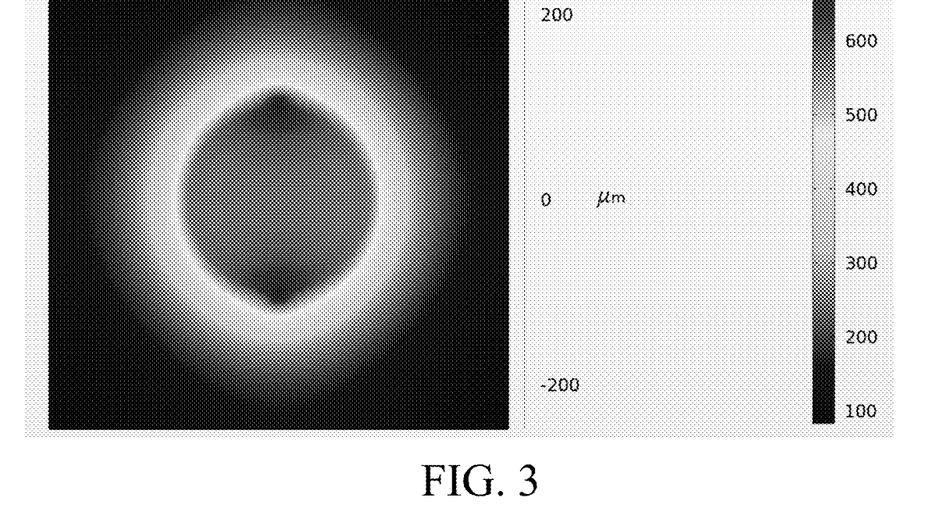
FIG. 3 is a simulation diagram of temperature distribution of the heating layer provided in Embodiment 1 of the present invention.

As shown in FIG. 2, the heating electrodes in this embodiment include a first heating resistance wire 211, a second heating resistance wire 212, and a third heating resistance wire 213. A cross-sectional area of the first heating resistance wire 211 is larger than that of the second heating resistance wire 212, and the cross-sectional area of the second heating resistance wire 212 is larger than that of the third heating resistance wire 213. Each of the first heating resistance wire 211, the second heating resistance wire 212, and the third heating resistance wire 213 is connected end to end to form a circular ring, and the three heating resistance wires are in gradient distribution on the silicon-based substrate. The circular ring formed by the second heating resistance wire 212 is located within the circular ring formed by the third heating resistance wire 213, and the circular ring formed by the first heating resistance wire 211 is located within the circular ring formed by the second heating resistance wire 212. Specifically, the first heating resistance wire 211 has a cross-sectional thickness of 300 nm and a cross-sectional width of 20 µm, and is connected end to end to form a circular ring with an inner ring diameter of 5 µm; the second heating resistance wire 212 has a cross-sectional thickness of 300 nm and a cross-sectional width of 15 µm, and is connected end to end to form a circular ring with an inner ring diameter of 30 µm; and the third heating resistance wire 213 has a cross-sectional thickness of 300 nm and a cross-sectional width of 10 µm, and is connected end to end to form a circular ring with an inner ring diameter of 65 µm. The heating layer also includes heating electrode pads 23 and a heating electrode lead 25. The heating electrode lead 25 passes through the circular rings formed by the first heating resistance wire 211, the second heating resistance wire 212 and the third heating resistance wire 213 and is connected to the heating electrode pads 23. The first heating resistance wire 211 forms a first heating region 201 which has an area of 50*50 µm$^2$, and can provide a heating temperature of 570-630° C., and the material of the gas-sensitive film heated thereby correspondingly is SnO2; the second heating resistance wire 212 forms a second heating region 202 which has an area of 90*90 µm$^2$, and can provide a heating temperature of 370-430° C., and the material of the gas-sensitive film heated thereby correspondingly is NiO; and the third heating resistance wire 213 forms a third heating region 203 which has an area of 130*130 µm$^2$, and can provide a heating temperature of 220-280° C., and the material of the gas-sensitive film heated thereby correspondingly is In2O3. A simulation diagram of temperature distribution of the heating layer provided in this embodiment is as shown in FIG. 3. The temperature of the heating layer decreases from the center to the outer edge. The temperature in a central region can reach 600° C., and the temperature at the outer edge is 100-200° C.

In an implementation, the plurality of heating resistance wires are arranged to be spaced apart, and the spacing d between two adjacent heating resistance wires is 2-5 times the cross-sectional widths w of the heating resistance wires (if the cross-sectional widths of the two adjacent heating resistance wires are not equal, the spacing between the two adjacent heating resistance wires is 2-5 times the cross-sectional width of the heating resistance wire with the larger cross-sectional width). According to a simulation result, when the cross-sectional width w is greater than 50 µm and a relationship between the spacing d between the two adjacent heating resistance wires and the cross-sectional width w meets $2w \leq d \leq 5w$, there is a temperature gradient being at least 6° C. between the two adjacent heating resistance wires in a direction from the center of the heating layer to the edge of the heating layer, and the temperature decreases with an increase of a radial length to form heating regions of different temperatures; and increasing the spacing between the two adjacent heating resistance wires can increase a temperature difference between the heating regions.

In this embodiment, the temperature of the third heating region 203 is lower than that of the second heating region 202, the temperature of the second heating region 202 is lower than that of the first heating region 201, and the heating regions with three temperature gradients are formed on the heating layer. The first heating region 201 is coated with a gas-sensitive sensing material with a higher heating temperature requirement, and the third heating region 203 is coated with a gas-sensitive sensing material with a lower heating temperature requirement, and the gas-sensitive sensing materials of the first heating region 201, the second heating region 202, and the third heating region 203 detect a particular gas component, respectively. Under the condition of applying a voltage of 8 V at two ends of the heating electrode lead, the heating temperature of the first heating region 201 can reach a maximum of about 600° C., the heating temperature of the second heating region 202 is about 350° C., and the heating temperature of the third heating region 203 can reach a minimum of 250° C. The heating regions with different temperature gradients are achieved by the different heating resistance wires, and multiple gas-sensitive sensing materials are heated simultaneously on the same heating layer.

Embodiment 2

The resistance calculation formula is R=ρ·L/S=ρ·L/(w·t), where ρ represents the resistivity of the heating resistance wire (related to the gas-sensitive sensing material), L represents the length of the heating resistance wire, S represents the cross-sectional area of the heating resistance wire (S=w·t), w represents the cross-sectional width of the heating resistance wire, and t represents the cross-sectional thickness of the heating resistance wire. Generally, the heating temperature required for a gas-sensitive sensing material is 100-700° C., the resistance R of the heating electrodes is 70Ω-250Ω, and the deposited thickness of the heating resistance wires (i.e., cross-sectional thickness t) is 300 nm-500 nm. The cross-sectional width w of the heating resistance wire is 50 μm-150 μm, and its length L is 10 mm-20 mm, as calculated according to the above resistance calculation formula.

Figure 4:
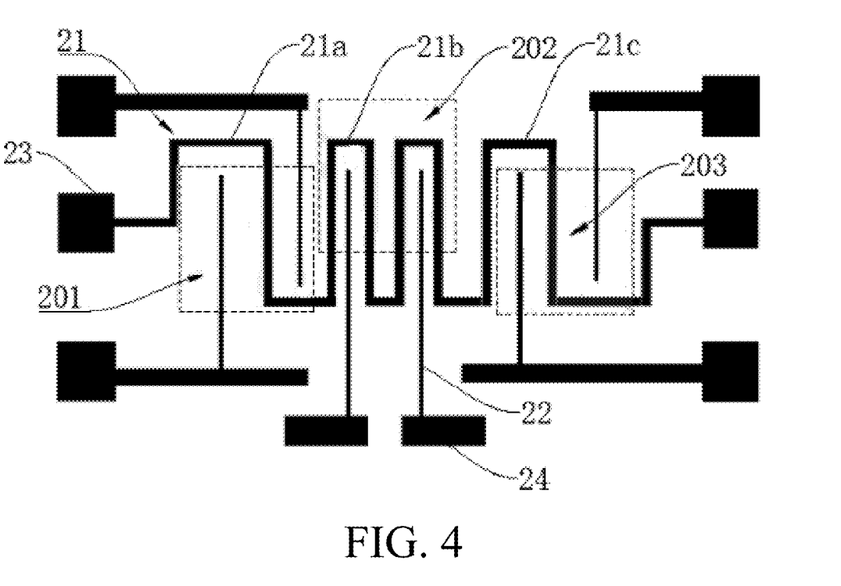
FIG. 4 is a schematic diagram of a heating layer of a gas sensor provided in Embodiment 2 of the present invention.

FIG. 4 is a schematic diagram of a heating layer of a gas sensor provided in Embodiment 2 of the present invention. As shown in FIG. 4, a heating electrode 21 of the heating layer is a heating resistance wire with different segments, each segment of the heating resistance wire having a different cross-sectional area, and each segment corresponding to a heating region, respectively. In this embodiment, each segment of the heating resistance wire is arranged to be bent in a serpentine curve, and measuring electrodes 22 are distributed in bent arc regions of the heating resistance wire in each segment. The heating resistance wire includes a first-segment resistance wire 21a, a second-segment resistance wire 21b, and a third-segment resistance wire 21c, wherein the first-segment resistance wire 21a has a cross-sectional thickness of 100 nm-300 nm and a cross-sectional width of 10 μm, and is arranged to be bent in a serpentine curve with spacing of 20 μm; the second-segment resistance wire 21b has a cross-sectional thickness of 100 nm-300 nm and a cross-sectional width of 15 μm, and is arranged to be bent in a serpentine curve with spacing of 10 μm; and the third-segment resistance wire 21c has a cross-sectional thickness of 100 nm-300 nm and a cross-sectional width of 5 μm, and is arranged to be bent in a serpentine curve with spacing of 30 μm. The first-segment resistance wire 21a forms a first heating region 201 which has an area of 60*60 μm$^2$, and can provide a heating temperature of 360-440° C., and the material of the gas-sensitive film heated thereby correspondingly is NiO; the second-segment resistance wire 21b forms a second heating region 202 which has an area of 90*90 μm$^2$, and can provide a heating temperature of 580-600° C., and the material of the gas-sensitive film heated thereby correspondingly is SnO2; and the third-segment resistance wire 21c forms a third heating region 203 which has an area of 75*75 μm$^2$, and can provide a heating temperature of 300-360° C., and the material of the gas-sensitive film heated thereby correspondingly is WO3. In this embodiment, the heating layer further includes a pair of heating electrode pads 23 and a plurality of pairs of measuring electrode pads 24. Two ends of the heating resistance wire are connected to the heating electrode pads 23, and the measuring electrodes 22 are connected to the corresponding measuring electrode pads 24, respectively.

Figure 5:
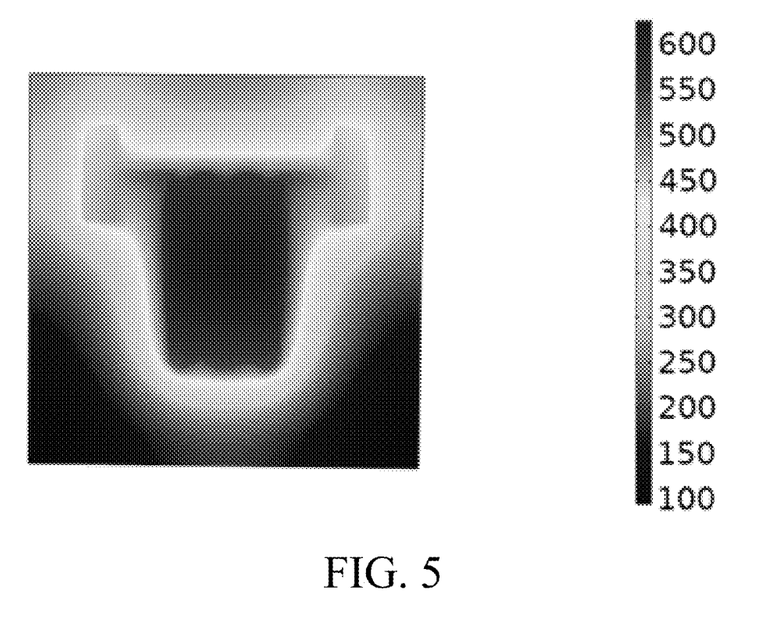
FIG. 5 is a simulation diagram of temperature distribution of the heating layer provided in Embodiment 2 of the present invention.

In this embodiment, the cross-sectional widths of the first-segment resistance wire 21a, the second-segment resistance wire 21b, and the third-segment resistance wire 21c increase successively, and the heating temperatures of the first heating region 201, the second heating region 202, and the third heating region 203 decrease successively. A simulation diagram of temperature distribution of the heating layer provided in this embodiment is as shown in FIG. 5. Under the condition of applying a voltage of 8 V at the two ends of the heating resistance wire, the heating temperature of the second heating region 202 can reach a maximum of about 600° C., the heating temperature of the first heating region 201 or the third heating region 203 can reach a minimum of 350° C. In this embodiment, the heating regions with different temperature gradients are achieved by the same heating resistance wire, and multiple gas-sensitive sensing materials are heated simultaneously on the same heating layer.

Embodiment 3

Figure 6:
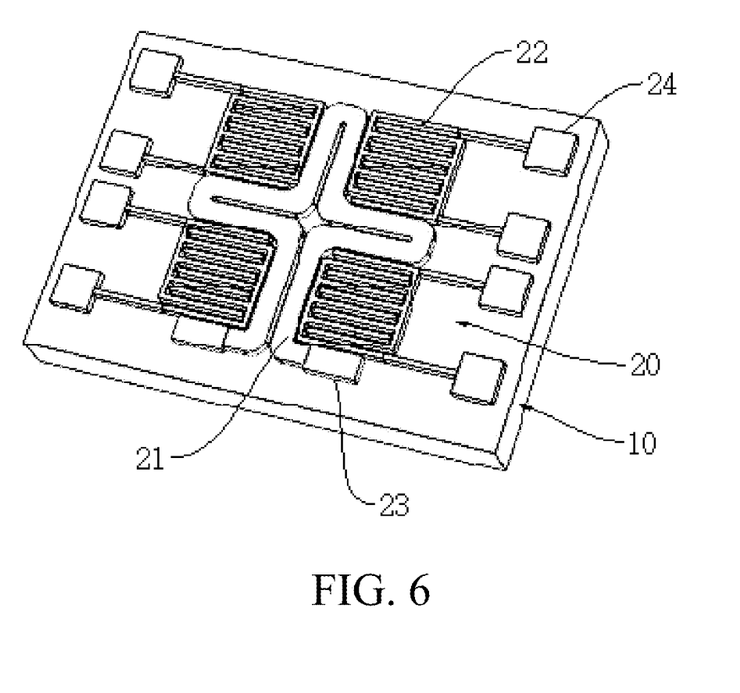
FIG. 6 is a schematic diagram of a heating layer of a gas sensor provided in Embodiment 3 of the present invention.

FIG. 6 is a schematic diagram of a heating layer of a gas sensor provided in Embodiment 3 of the present invention. As shown in FIG. 6, a heating electrode 21 of the heating layer is formed by winding a heating resistance wire and is distributed in a central region of the heating layer 20, and measuring electrodes 22 are distributed around the heating electrode 21 and are located in the same plane as the heating electrode. There are 4 pairs of measuring electrodes 22, and the heating electrode 21 and the measuring electrode 22 are arranged in the same plane of the silicon-based substrate 10; and the 4 pairs of measuring electrodes 22 are all adjacent to the heating electrode 21, and the 4 pairs of measuring electrodes 22 are heated together by the heating electrode 21. A pair of heating electrode pads 23 and 4 pairs of measuring electrode pads 24 are arranged on the surface of the silicon-based substrate 10. Two ends of the heating electrode 21 are led to the heating electrode pads 23, and the measuring electrodes 22 are led to the corresponding measuring electrode pads 24, respectively.

Figure 7:
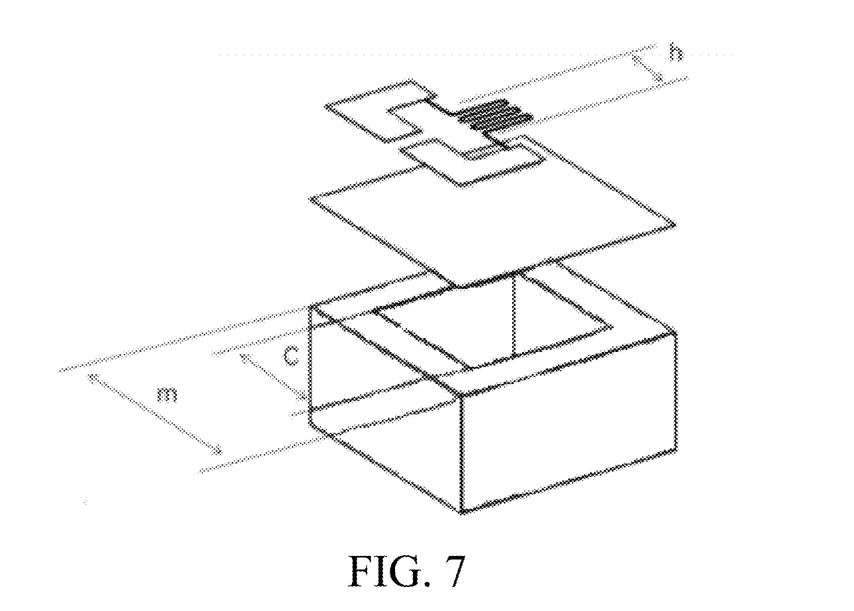
FIG. 7 is a schematic diagram of geometric parameter definition of a micro-heating structure provided in Embodiment 3 of the present invention.
Figure 8:
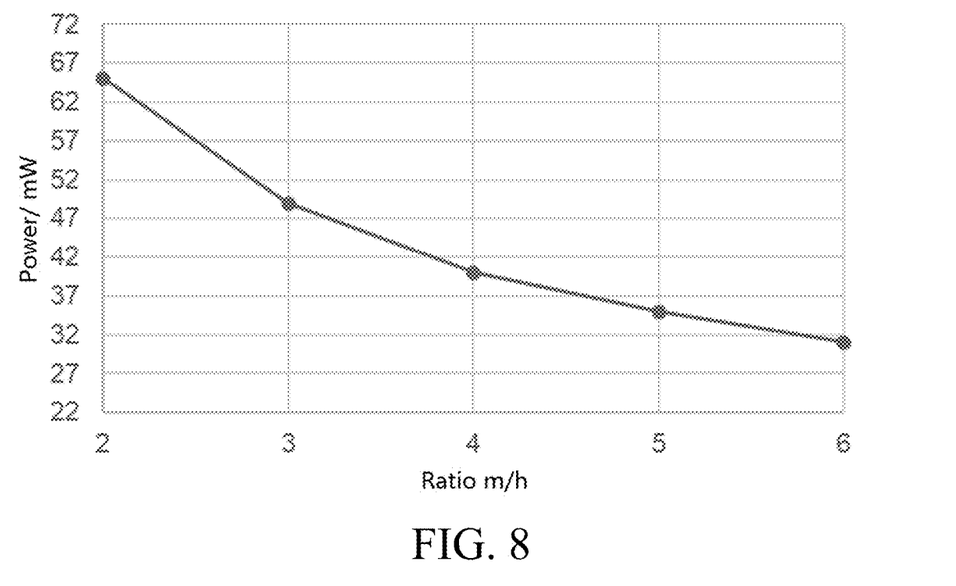
FIG. 8 is a diagram of a relationship between a ratio m/h of a geometry length of the heating layer to a geometry length of a region where a heating electrode is distributed and a power provided in Embodiment 3 of the present invention.
Figure 9:
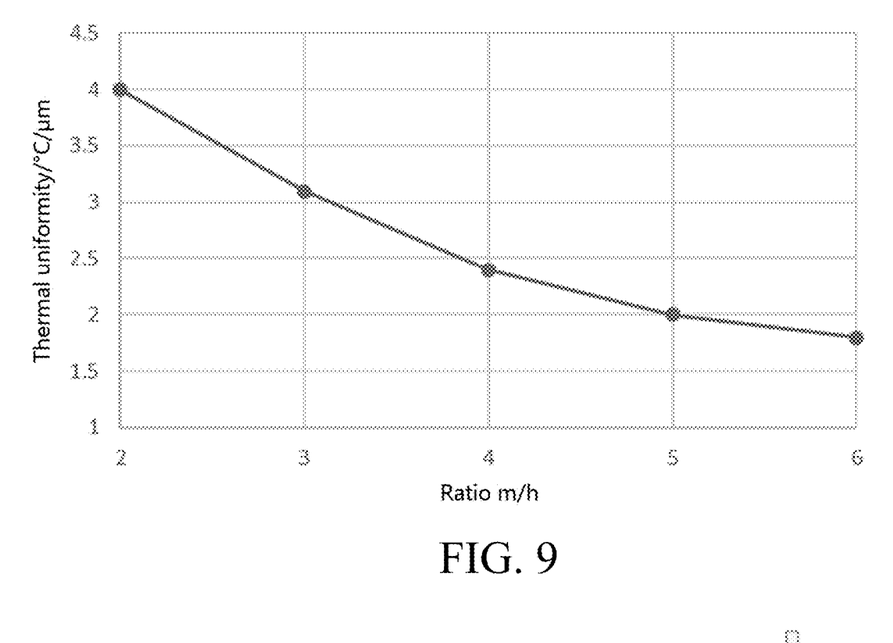
FIG. 9 is a diagram of a relationship between a ratio m/h of the geometry length of the heating layer to the geometry length of the region where the heating electrode is distributed and thermal uniformity provided in Embodiment 3 of the present invention.

As shown in FIG. 7, m represents a geometry length of the heating layer, h represents a geometry length of the region where the heating electrode is distributed, and C represents a geometry length of a cavity of the silicon-based substrate. As shown in FIG. 8, according to a relationship between a ratio m/h of the geometry length of the heating layer to the geometry length of the region where the heating electrode is distributed and a power, it can be seen the geometry length m of the heating layer is 1-6 times the geometry length h of the region where the heating electrode is distributed. The geometry length m of the heating layer is 500 μm-3000 μm, and the geometry length h of the region where the heating electrode 21 is distributed is 85 μm-3000 μm. The relationship between m/h and power consumption is as shown in FIG. 8. In addition, the layout of the heating electrode and the measuring electrodes is related to thermal uniformity. As shown in FIG. 9, as m/h increases, the change in temperature gradient per micron from the temperature center (heating electrode) to the edge of the heating layer becomes smaller. The higher the ratio is, the better the power and the uniformity are, but it is not advisable to further increasing the range of m/h from the perspective of processing and economic benefits.

On the other hand, a cavity 13 of the silicon-based substrate 10 is conducive for the heating layer 20 with the heating electrode 21 arranged in the center to reach a higher operating temperature. The geometry length C of the cavity 13 is not greater than twice the geometry length h of the region where the heating electrode 21 is distributed, i.e., 0≤C/h≤2. The heating layer 20 can reach a stable temperature of 700° C. when the ratio of C/h is at a maximum value. The geometry length h of the region where the heating electrode 21 is distributed is 85 μm-3000 μm, and the geometry length C of the cavity 13 is preferably 50 μm-6000

μm. The measuring electrodes 22 may be of an interdigital structure with a wire width and spacing both being 1 μm-10 μm. The heating electrode 21 is formed by winding a heating resistance wire, which has a thickness of 300 nm-500 nm and a width w of 10 μm-100 μm. The spacing d between two winding segments of the heating resistance wire is less than twice the width w of the heating resistance wire, i.e., d<2w. The heating temperature required for the gas-sensitive sensing material can reach a maximum of 700° C., and the resistance R of the micro-heating structure is generally 90Ω-200Ω. The resistance calculation formula is R=ρ·L/S=ρ·L/(w·t), where ρ represents the resistivity of the heating resistance wire (related to the gas-sensitive sensing material), L represents the length of the heating resistance wire, S represents the cross-sectional area of the heating resistance wire (S=w·t), w represents the width of the heating resistance wire, and t represents the thickness of the heating resistance wire. Thus, the length of the heating resistance wire L is in the range of 1.5 mm-13 mm, as calculated according to the resistance calculation formula. In a preferred implementation, the heating resistance wire has a cross-sectional thickness of 300 nm-500 nm, a cross-sectional width of 10 μm-100 μm and a length of 1.5 mm-13 mm.

Figure 10:
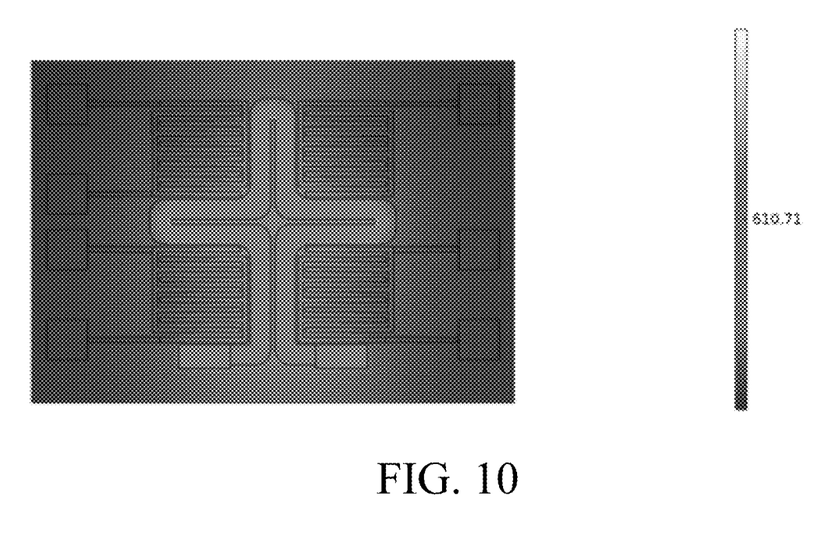
FIG. 10 is a simulation diagram of temperature distribution of the heating layer provided in Embodiment 3 of the present invention.

FIG. 10 is a simulation diagram of temperature distribution of the heating layer provided in this embodiment. Simulation conditions are as follows: the geometry length of the heating layer is m=500 μm, the geometry length of the region where the heating electrode is distributed is h=245 μm, m/h=500 μm/245 μm=2, the width of the heating resistance wire is w=20 μm, the spacing of the heating resistance wire is d=50 μm, and the thickness of the heating resistance wire is t=300 nm. Referring to FIG. 10, under the above simulation conditions, at a heating power of 48 mW, the heating temperatures are all around 610° C., and a temperature difference of the heating layer is relatively small.

The micro-heating structure of this embodiment has a small temperature difference between the heating regions and is suitable for gas-sensitive sensing materials with a small difference in response temperature (within 30° C.). For example, differences in optimal operating temperatures of the gas-sensitive sensing materials Co3O4, MoO2, ZnO, and MoS are all within 30° C.

According to the gas sensor provided in the above embodiment of the present invention, by integrating the heating electrodes of different sizes or different layouts on the single micro-heating structure to form the heating regions of different temperatures to provide corresponding heating temperatures for different sensing materials, a complex atmosphere detection function of a variety of sensing materials at different temperatures is achieved; and meanwhile, the volume of the whole device is decreased, the power consumption is reduced, and the integration level of the gas sensor is improved. Furthermore, based on the three dimensions of selectivity, broad-spectrum response and temperature characteristic of the gas-sensitive material, the gas sensor of the present invention can achieve a multi-parameter (different sensing materials and different temperatures) gas detection function, thereby achieving complex atmosphere detection by a single gas sensor in combination with multiple sensing materials at different temperatures Embodiment 4

Figure 11:
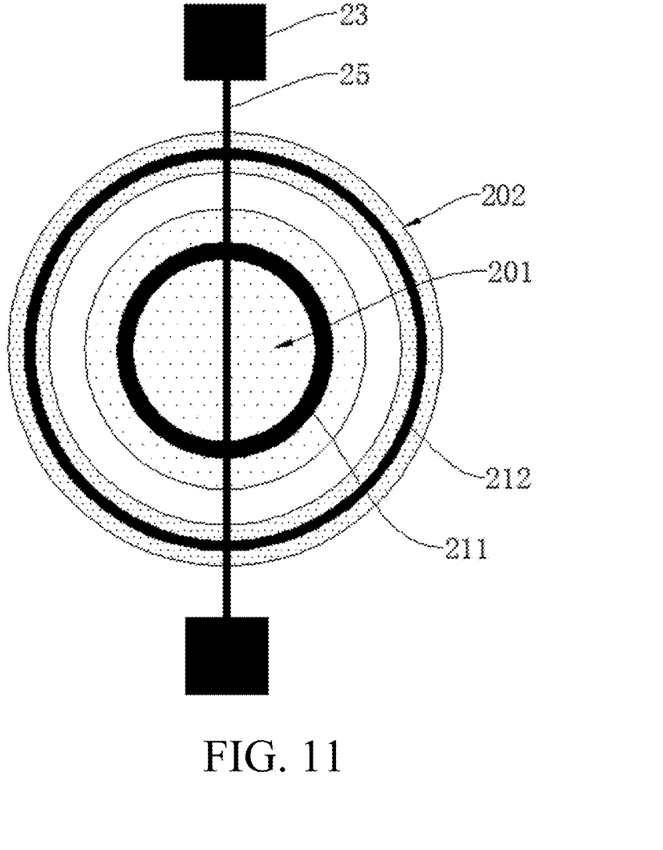
FIG. 11 is a schematic diagram of a heating layer of a gas sensor provided in Embodiment 4 of the present invention.
Figure 12:
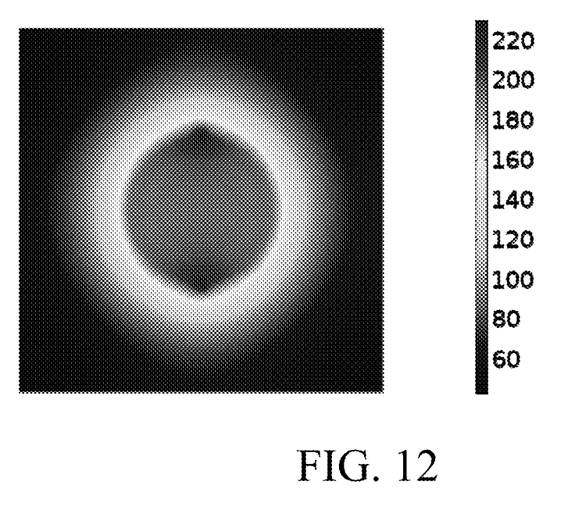
FIG. 12 is a simulation diagram of temperature distribution of the heating layer provided in Embodiment 4 of the present invention.

FIG. 11 is a schematic diagram of a heating layer of a gas sensor provided in Embodiment 4 of the present invention. As shown in FIG. 11, heating electrodes in this embodiment include a first heating resistance wire 211 and a second heating resistance wire 212. A cross-sectional area of the first heating resistance wire 211 is larger than that of the second heating resistance wire 212. Each of the first heating resistance wire 211 and the second heating resistance wire 212 is connected end to end to form a circular ring, and the circular ring formed by the first heating resistance wire 211 is located within the circular ring formed by the second heating resistance wire 212. Specifically, the first heating resistance wire 211 has a cross-sectional thickness of 300 nm and a cross-sectional width of 20 μm, and is connected end to end to form a circular ring with an inner ring diameter of 5 μm; and the second heating resistance wire 212 has a cross-sectional thickness of 300 nm and a cross-sectional width of 15 μm, and is connected end to end to form a circular ring with an inner ring diameter of 30 μm. The heating layer also includes heating electrode pads 23 and a heating electrode lead 25. The heating electrode lead 25 passes through the circular rings formed by the first heating resistance wire 211 and the second heating resistance wire 212 and is connected to the heating electrode pads 23. The first heating resistance wire 211 forms a first heating region 201, and the second heating resistance wire 212 forms a second heating region 202. Under the condition of applying a voltage of 1.5 V at two ends of the heating resistance wires, the heating temperature of the first heating region 201 is 200-230° C., and the heating temperature of the second heating region 202 is 160-180° C. A simulation diagram of temperature distribution of the heating layer under this condition is as shown in FIG. 12.

The first heating region 201 and the second heating region 202 may be coated with the same gas-sensitive film. Different response signals are generated from the same gas-sensitive film at different temperatures, and different gases can be detected according to the different response signals. For example, both the first heating region 201 and the second heating region 202 are coated with a $Co_3O_4$ nanocube sensing material, as the Co3O4 nanocube sensing material has responses to all four gases H2S, CO, CH4 and H2, the different gases can be further distinguished according to the different responses of the Co3O4 nanocube to the different gases under different temperature conditions, thereby achieving multi-gas detection by the same sensing material under different temperature conditions.

Embodiment 5

Figure 13:
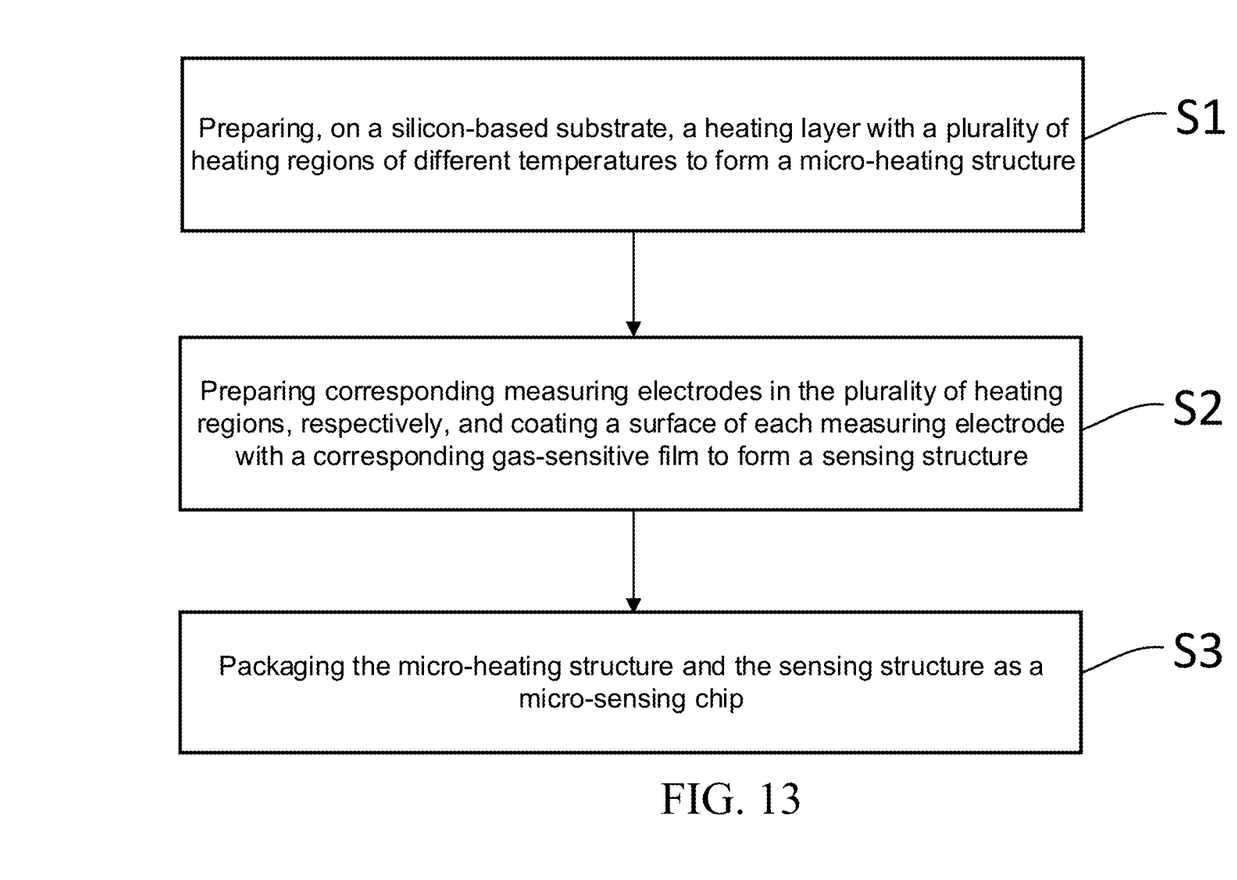
FIG. 13 is a flow diagram of a manufacturing method for a gas detector provided in Embodiment 5 of the present invention.

FIG. 13 is a flow diagram of a manufacturing method for a gas detector provided in Embodiment 5 of the present invention. As shown in FIG. 13, the manufacturing method for the gas detector provided in this embodiment includes the following steps.

S1) Preparing, on a silicon-based substrate, a heating layer with a plurality of heating regions of different temperatures to form a micro-heating structure.

A plurality of heating resistance wires with different cross-sectional areas or a heating resistance wire having a plurality of segments with different cross-sectional areas is prepared on the silicon-based substrate, to form a plurality of heating regions of different temperatures.

For example, a plurality of heating resistance wires with different cross-sectional areas are prepared on the silicon-based substrate by an etching process or a photolithography and lift-off process, to form a plurality of heating regions of different temperatures. For example, a SOI wafer layer with p-type boron-doped silicon (Si) is used as the silicon-based substrate. An SOI (Silicon-On-Insulator) wafer means that a buried oxide (BOX) layer is introduced as a support layer between top-layer silicon and a back substrate, and a front side and a back side of the silicon wafer are coated with a silicon oxide or silicon nitride film layer with a thickness of no greater than 1 μm by a plasma-enhanced chemical vapor deposition method. A thin photoresist film is spin-coated on a surface of the silicon wafer, and a photoresist solvent part is evaporated by heating, and then a pre-custom-made mask is precisely aligned thereto; a specified region on the photoresist is exposed by the ultra-violet lithography technology, and the exposed side is evaporated with a heating layer with a thickness of 100-500 nm by metal through vacuum evaporation. The silicon wafer after evaporation is soaked in an acetone solution for 4-5 hours to dissolve the photoresist and rinse off excess evaporated metal to form a heating layer.

S2) Preparing corresponding measuring electrodes in the plurality of heating regions, respectively, and coating a surface of each measuring electrode with a corresponding gas-sensitive film to form a sensing structure. The gas-sensitive film is made from a metal oxide nano-gas-sensitive material, which is any one or more of SnO2, WO3, $In_2O_3$, NiO, MoO2, Co3O4, ZnO, and MoS.

The measuring electrodes are prepared in the heating regions of different temperatures, and the surface of each measuring electrode is coated with the gas-sensitive film matched with the heating temperature of the heating region where the measuring electrode is located. In the case where the heating resistance wires and the measuring electrodes are located in the same plane, the measuring electrodes may be prepared during preparation of the heating resistance wires. For example, a sacrificial layer is prepared on the surface of the silicon-based substrate, images of the heating resistance wires and the measuring electrodes are formed on the surface of the silicon-based substrate by a photolithography process, and then the sacrificial layer is etched by an etching process to form the heating resistance wire and the measuring electrodes.

A metal oxide nanomaterial is prepared by hydrothermal, solvothermal, and microwave synthesis methods to serve as a gas-sensitive sensing material. The synthesis process is performed under high-temperature and high-pressure conditions to promote conversion of metal salts into metal oxides. An in-situ reaction is carried out simultaneously throughout the synthesis process, to facilitate transfer of electrons therebetween, thereby improving the gas-sensitive properties of the material, and this is suitable for metal oxides with different morphologies (nanoparticles, nanowires, nanosheets, etc.) and in different states (dispersions, solid powder, etc.). The metal oxide nanomaterial prepared by the above method is a specificity or broad-spectrum type gas-sensitive material that can react with oxidizing and reducing gases. The method of coating the gas-sensitive material on the surface of each measuring electrode is, for example, a drop casting method, an air jet method, a micro jet method, a deposition method, or a writing-brush spot-coating method. The gas-sensitive film is formed after the coated gas-sensitive material is dried.

S3) Packaging the micro-heating structure and the sensing structure as a micro-sensing chip.

A suitable micro-heating structure is selected according to a temperature difference ΔT of the operating temperature of the gas-sensitive sensing material. If the temperature difference ΔT of the optimal operating temperature range of the selected gas-sensitive sensing material is within 0-30° C., the micro-heating structure provided in Embodiment 3 can be used. If the temperature difference ΔT of the optimal operating temperature range of the selected gas-sensitive sensing material is greater than 30° C., the micro-heating structure provided in Embodiment 1 or Embodiment 2 can be used to regulate the temperature in different regions by changing the width and spacing of the heating resistance wire.

For example, gas-sensitive property tests on $SnO_2$, $WO_3$, $In_2O_3$, and NiO nanomaterials show that the four sensing materials have selectivity in the interval range 20%≤$SL_x$<60% for a gas mixture of $NO_2$, $H_2S$, and CO, and thus have broad-spectrum response characteristics. The optimal operating temperatures of the four materials are respectively measured as: SnO2 (600° C.), $WO_3$ (350° C.), $In_2O_3$ (250° C.), and NiO (400° C.), and if the four materials are used as the gas-sensitive sensing materials, the temperature difference ΔT of the optimal operating temperature range is greater than 30° C., and the micro-heating structure provided in Embodiment 1 or Embodiment 2 is used.

Thereafter, the selected micro-heating structure and the sensing structure are integrated and packaged as a micro-sensing chip, and then the micro-sensing chip is integrally packaged with a circuit board integrated with a signal detection system (detecting multiple electric signals generated by the micro-sensing chip, and determining the type and concentration of the gases corresponding to the electric signals according to changes in the electric signals) to form a gas sensor.

An implementation of the present invention also provides a gas detection method that uses the above-mentioned multi-dimensional multi-parameter gas sensor to detect gases. The gas detection method includes detecting a gas mixture composed of two or more gases, implements gas concentration detection based on the selectivity, broad-spectrum response and temperature characteristics of the gas-sensitive materials, and can selectively distinguish a target gas from the complex gas mixture, thus improving the accuracy of multi-component gas detection.

Optional embodiments of the present invention are described above in detail in conjunction with the accompanying drawings. However, the implementations of the present invention are not limited to the specific details in the above embodiments. Within the scope of the technical concept of the embodiments of the present invention, various simple modifications may be made to the technical solutions of the embodiments of the present invention, and these simple modifications are all encompassed within the protection scope of the implementations of the present invention. In addition, it is to be noted that the specific technical features described in the above specific embodiments may be combined in any suitable manner without contradiction, and the combinations should also be regarded as contents disclosed in the implementations of the present invention so long as they do not depart from the idea of implementations of the present invention.

The invention claimed is:

1. A gas sensor, comprising:
   a sensing structure for generating, in response to a plurality of gases, a plurality of corresponding electric signals, comprising a plurality of measuring electrodes, wherein each measuring electrodes has a gas-sensitive film coating applied thereon; and
   a micro-heating structure for heating the sensing structure, comprising a silicon-based substrate and a heating layer disposed on the silicon-based substrate,
   wherein the heating layer integrates a plurality of heating electrodes to form a plurality of heating regions to be heated to more than one temperatures, and each of the plurality of measuring electrodes is integrated in a corresponding heating region, and
wherein at least one of the plurality of heating electrodes has a cross-sectional area or a length different from another heating electrode among the plurality of heating electrodes.

2. The gas sensor according to claim 1, wherein each of the plurality of heating electrodes is a heating resistance wire having a cross-sectional thickness of 300 nm-500 nm, a cross-sectional width of 10 μm-100 μm, and a length of 1.5 mm-20 mm.

3. The gas sensor according to claim 2, wherein the plurality of heating resistance wires are spaced apart from one another; and a spacing between two adjacent heating resistance wires is 2-5 times the cross-sectional width of the heating resistance wires.

4. The gas sensor according to claim 2, wherein each of the plurality of heating resistance wires is connected end to end to form a circular ring.

5. The gas sensor according to claim 4, comprising a first heating resistance wire, a second heating resistance wire, and a third heating resistance wire, wherein:
the first heating resistance wire has a cross-sectional thickness of 300 nm and a cross-sectional width of 20 μm, and is connected end to end to form a circular ring with an inner ring diameter of 5 μm;
the second heating resistance wire has a cross-sectional thickness of 300 nm and a cross-sectional width of 15 μm, and is connected end to end to form a circular ring with an inner ring diameter of 30 μm; and
the third heating resistance wire has a cross-sectional thickness of 300 nm and a cross-sectional width of 10 μm, and is connected end to end to form a circular ring with an inner ring diameter of 65 μm.

6. The gas sensor according to claim 5, wherein the first heating resistance wire forms a first heating region to heated to a heating temperature of 570-630° C.; the second heating resistance wire forms a second heating region to be heated to a heating temperature of 370-430° C.; and the third heating resistance wire forms a third heating region to be heated to a heating temperature of 220-280° C.

7. The gas sensor according to claim 1, wherein each of the plurality of heating electrodes is a heating resistance wire having more than one segments, each segment of the heating resistance wire has a different cross-sectional area and corresponds to a heating region.

8. The gas sensor according to claim 7, wherein each segment of the heating resistance wire is arranged in a serpentine curve, and one of the plurality of measuring electrodes is disposed in a bent arc region of a segment of the heating resistance wire.

9. The gas sensor according to claim 8, wherein the heating resistance wire comprises a first-segment resistance wire, a second-segment resistance wire, and a third-segment resistance wire, wherein:
the first-segment resistance wire has a cross-sectional thickness of 100 nm-300 nm and a cross-sectional width of 10 μm, and the first-segment resistance wire is bent in a serpentine curve with a spacing of 20 μm;
the second-segment resistance wire has a cross-sectional thickness of 100 nm-300 nm and a cross-sectional width of 15 μm, and the second-segment resistance wire is bent in a serpentine curve with a spacing of 10 μm; and
the third-segment resistance wire has a cross-sectional thickness of 100 nm-300 nm and a cross-sectional width of 5 μm, and the third-segment resistance wire is bent in a serpentine curve with a spacing of 30 μm.

10. The gas sensor according to claim 9, wherein the first-segment resistance wire forms a first heating region to be heated to a heating temperature of 360-440° C.; the second-segment resistance wire forms a second heating region to be heated to a heating temperature of 580-600° C.; and the third-segment resistance wire forms a third heating region to be heated to a heating temperature of 300-360° C.

11. The gas sensor according to claim 1, wherein the plurality of heating electrodes are disposed in a central region of the heating layer, and the plurality of measuring electrodes are distributed around the central region and are located on the same plane as the plurality of heating electrodes.

12. The gas sensor according to claim 11, wherein a geometry length of the heating layer is 1-6 times a geometry length of the central region, and the geometry length of the heating layer is between 500 μm and 3000 μm.

13. The gas sensor according to claim 12, wherein the plurality of heating electrodes is formed by winding a heating resistance wire; and the heating resistance wire has a cross-sectional thickness of 300 nm-500 nm, a cross-sectional width of 10 μm-100 μm and a length of 1.5 mm-13 mm.

14. A gas detection method, comprising detecting a gas by exposing the gas sensor according to claim 1 to the gas.

15. The gas detection method according to claim 14, wherein the gas is a mixture comprising two or more different gases.

16. A manufacturing method for a gas detector, comprising the following steps:
preparing a micro-heating structure by disposing, on a silicon-based substrate, a plurality of heating resistance wires with different cross-sectional areas or a heating resistance wire having a plurality of segments with different cross-sectional areas to form the plurality of heating regions;
disposing a measuring electrode in each of the plurality of heating regions;
coating a surface of each measuring electrode with a gas-sensitive film to form a sensing structure, wherein the gas-sensitive film is made from a metal oxide nano-gas-sensitive material selected from $SnO_2$, $WO_3$, $In_2O_3$, $NiO$, $MoO_2$, $Co_3O_4$, $ZnO$, and $MoS$; and
packaging the micro-heating structure and the sensing structure as a micro-sensing chip.

17. The manufacturing method for the gas detector according to claim 16, wherein, in the coating step,
the surface of each measuring electrode is coated with a gas-sensitive film that matches the heating temperature of the heating region in which the measuring electrode is located.

* * * * *